Dec. 18, 1951     G. A. TINNERMAN     2,579,279
SHEET METAL SPRING CLIP
Filed Feb. 24, 1948
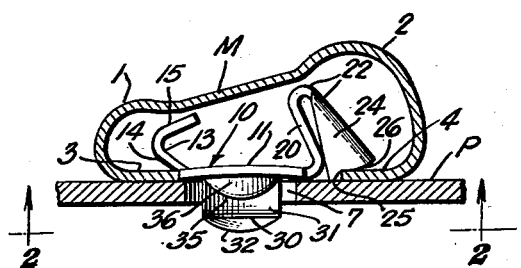
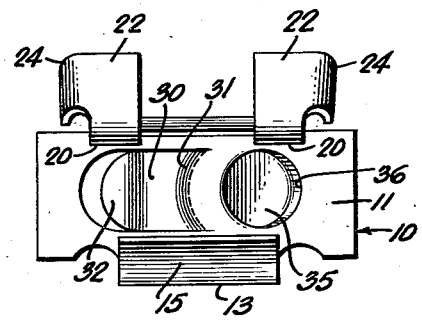
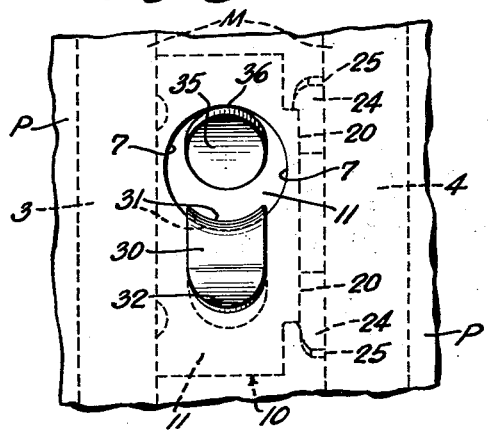
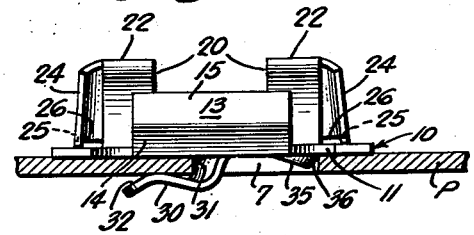
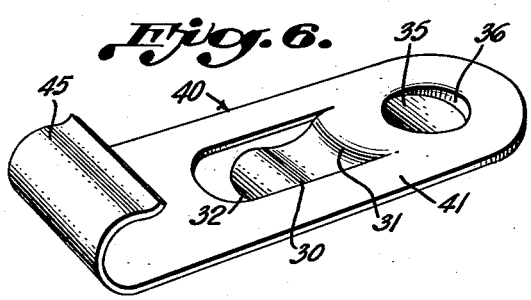
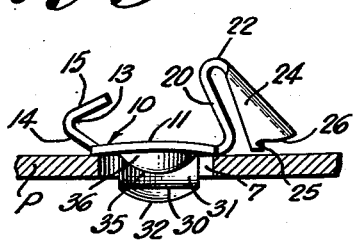
Inventor
GEORGE A. TINNERMAN
H. G. Lombard
ATTORNEY Patented Dec. 18, 1951

2,579,279

UNITED STATES PATENT OFFICE 2,579,279

SHEET METAL SPRING CLIP

George A. Tinnerman, Cleveland, Ohio, assignor to Tinnerman Products, Inc., Cleveland, Ohio, a corporation of Ohio Application February 24, 1948, Serial No. 10,505

5 Claims. (Cl. 24—73)

This invention relates to an improved molding construction or the like embodying fastening devices in the form of substantial retainers adapted for ready application to an apertured supporting structure to provide the same with means for mounting the molding thereon or for securing a cooperating part, object or other article of manufacture to said supporting structure.

The invention is directed, more particularly, to a molding construction or the like comprising improved forms of retainers provided with attaching means which may be readily interlocked in an opening in a sheet metal supporting structure, for example, by a simple operation taking place entirely from one side thereof, and including means for retaining a cooperating article or part, such as a molding or like object, in applied mounted position on such supporting structure.

The improved molding construction or the like of the invention embodies clip fasteners or retainers of the general type having attaching means which comprise a hook or tongue which is applied to clasping engagement over a marginal edge portion of an assembling opening in a part together with a locking shoulder also receivable in the assembling opening to lock the fastener in applied fastening position. Frequently the attaching opening in which the fastener is attached to a part is so exposed on the outer side of an installation that there is a tendency for water, dust, etc., to pass through the attaching opening into the interior of the assembly. In automobile installations, for example, this is highly objectionable inasmuch as the entrance of such water, dust and other foreign matter into the interior of the vehicle body results in damage to the upholstery, trim material and other equipment.

A primary object of the invention, therefore, is to provide an improved molding construction or other fastening construction and an attachable clip fastener or retainer therefor which is designed for attachment in an assembling opening in a supporting part in such a way that the fastener completely covers and closes such assembling opening and thereby prevents the passage of water, dust and other foreign matter through such assembling opening in the completed installation.

A further object of the invention is to provide such a molding construction or the like in which the fastener or retainer comprises an improved type of attaching means by which the attaching opening in a support is rendered impervious to the passage of water, dust and other foreign matter and in which the attaching means is so designed as to be easily and quickly slid into fastening position in interlocked engagement with the supporting part and retained in such fastening position against inadvertent disconnection or accidental removal.

Another object of the invention is to provide an improved molding construction or other fastening construction embodying a retainer such as described which is adapted for a leak-proof and dust-proof attachment in an assembling opening in a part and which comprises an attaching tongue or hook and a cooperating imperforate protuberance defining a locking shoulder which locks the fastener in such attached position in the assembling opening against loosening or removal from applied fastening position and otherwise closes said assembling opening against the passage of water, dust and other foreign matter.

A further object of the invention is to provide a molding construction or the like comprising attachable retainers, as aforesaid, having a relatively wide range of application and use in that they are adapted for attachment to supporting parts of various thicknesses.

An additional object of the invention is to provide a molding construction and a retainer therefor having all the foregoing features and advantages of construction together with an improved spring arm construction providing a strong and durable retaining means for mounting moldings which are relatively heavy and wide and of irregular cross-section.

Further objects and advantages, and other new and useful features in the construction, arrangement and general combination of parts of the invention will be apparent as the following description proceeds with reference to the accompanying drawings, for purposes of illustration but not of limitation, in which like reference characters designate like parts throughout, and in which:

Fig. 1 is a vertical sectional view showing the improved retainer of the invention as attached to a supporting part and mounting a channel-shaped molding or trim strip represented in section;

Fig. 2 is a bottom plan view of Fig. 1 along line 2—2, looking in the direction of the arrows;

Fig. 3 is a top plan view of the retainer or clip fastener shown employed in Figs. 1 and 2;

Fig. 4 shows the retainer in side elevation as initially attached in an assembling opening in an apertured part, represented in section; and, Fig. 5 is an end view of the fastener shown in Fig. 4 as initially attached in an assembling opening in an apertured part.

Fig. 6 is a perspective view of another form of retainer for mounting a cable, or rod, or the like; and, Fig. 7 is a sectional view showing the retainer of Fig. 6 as attached in an assembling opening in a part in a completed installation.

Referring now, more particularly, to the drawings, it will be understood that the molding construction or the like of the present invention is one of the general character in which a molding M, trim strip, beading, or other object may be mounted onto a supporting part, P, by an operation taking place entirely from the forward or readily accessible side thereof. The invention, therefore, is particularly suited for use in installations involving a blind location in which the rearward side of the supporting part P is not conveniently or readily accessible for attaching the retainer used in the mounting of a molding or other object onto the supporting part.

The retainers or fasteners in the invention are provided in the manner of substantial clip devices comprising combined attaching means and spring arm holding means, the attaching means being adapted to be easily and quickly applied to substantially locked fastening position in an assembling opening in the supporting structure from the forward side thereof, whereupon the molding or other object may then be applied to the holding arms of the retainer in fully mounted position on the supporting structure by an operation likewise taking place from the forward side thereof. Thus, there is no need for access to the rearward side of the supporting part as is necessary when the retainers are attached by bolt and nut fastenings required to be secured together from both sides of the supporting structure. At the same time, the improved retainers of the invention are so designed as to close and cover the assembling opening completely to prevent the passage of water, dust and other foreign matter into the interior of the completed assembly.

The form of retainer device shown in Figs. 1-5 inclusive, designated generally 10, is constructed most economically from a relatively small, inexpensive blank of sheet metal material which is best provided in the manner of a simple section severed from standard sheet metal strip stock with minimum loss or waste of material. Any suitable sheet metal may be employed but preferably of a spring metal nature such as spring steel or cold rolled steel having spring characteristics. On either side of the approximate midportion or base 11 of the blank, spring holding means are provided in a manner to permit the molding or other finishing object to be sprung thereon in mounted position on the supporting structure P, as shown in Fig. 1.

In the present example, the retainer 10 is shown as provided for mounting an iregular shaped molding M in the form of a channel-shaped trim strip or the like in which the crown of the molding M comprises a lower beading 1 merging into a larger beading 2. The respective spring arm holding means of the retainer are provided in a size and design indicated by the size and formation of the particular beading to be secured thereby. The smaller beading 1 of the molding M terminates in an inturned flange 3 and accordingly, the spring holding means for this side of the molding comprises a relatively short resilient spring arm 13 bent upwardly from the fastener base to provide an inwardly inclined cam shoulder 14 adjoining said fastener base 11. The outer end of said spring arm 13 is return bent to define an outwardly inclined cam surface 15 adapted to provide a gradual outward camming action on the edge of the inturned flange 3 in the application of the molding to mounted position, as presently to be described.

The other side of the retainer 10 is provided with relatively larger spring holding means commensurate with the size and design of the larger beading 2 and otherwise suitably designed for engaging the inturned flange 4 on said larger beading 2. Such spring holding means are shown defined by a pair of spaced similar spring arm portions 20 extending from the fastener base 11 and purposely provided as spaced separate spring elements to increase the resiliency and yieldability thereof. Each spring arm portion 20 includes an outwardly return bent spring finger 22 having an integral lateral wing 24 along its outer side bent rearwardly toward the fastener body. As shown in Figs. 1 and 5, the lower edge of each lateral wing preferably is recessed to define a right angled abutment 25 and adjacent foot 26 approximating the size of the inturned flange edge 4 to seat the same snugly and retain said inturned flange firmly and rigidly against the supporting panel or plate P. Each spring finger 22 and the lateral wing 24 carried thereby is yieldable relative to its associated spring arm 20 and the fastener base 11 in order to flex as necessary in the mounting of the molding M thereon. The provision of the abutments 25 on the wings 24 is advantageous in that the edge of the sheet metal material forming the fastener is utilized to provide a relatively wide and strong clamping and holding foot 26 bearing on and anchoring the inturned flange 4. The arrangement is such that the inner edge of the abutment 25 firmly and rigidly engages the edge of the inturned molding flange 2 while the adjacent lateral edge portion forming said foot 26 exerts a pronounced clamping action on said flange against the supporting part P. At the same time, inasmuch as each spring finger 22 is yieldable relative to its associated spring arm 20 and the fastener base 11, said abutment 25 on the wing 24 carried by each spring finger 22 is also yieldable as necessary in mounting the molding M as from the position of such abutment 25 when the spring finger 22 is untensioned as shown in Fig. 5, to the inwardly biased position shown in Fig. 1 in which the spring finger is tensioned in the mounted relation of the molding.

The supporting part P may be of any suitable material such as sheet metal, wood, fiber board, or the like, but inasmuch as the invention is employed mainly in metallic structures, the supporting part usually is in the form of a metallic panel or plate-like element. As best seen in Figs. 2 and 4, in order to adapt the supporting part P for use with a retainer device in accordance with the invention, there is provided an assembling opening of any suitable outline but preferably in the manner of simple circular opening 7 in which the attaching elements of the retainer 10 are received to secure the retainer and otherwise cover and close said assembling opening to prevent the entrance of water, dust, and other foreign matter through said assembling. When the assembling opening is provided in other than circular form as in the manner of a rectangular slot, the attaching elements of the retainer are designed in accordance with the outline of the opening to cover and conceal the same in a similar manner. It will be understood that a suitable number of such assembling openings 7 are prepared in the part P for the required retainers to be used, the same being provided in predetermined spaced relation on said part along the path which the molding or other object to be mounted by the retainers extends in mounted position.

The attaching elements of a retainer are designed to hold the retainer in self-sustained position on the supporting part P preparatory to the application of the molding or other part thereto in mounting such part on the supporting part by an operation taking place entirely from the forward side thereof. The attaching elements of the retainer comprise an attaching hook or tongue 30 struck and formed from the fastener body or base 11 which is otherwise preferably arched or bowed slightly in the area in which said hook or tongue depends therefrom. The hook or tongue 30 defines a shoulder 31 adjoining the fastener body or base 11 and a clasping portion spaced therefrom in normal untensioned relation a distance slightly less than the thickness of the supporting part P. Preferably the extremity or free end of said hook 30 terminates in an outwardly flared lip element 32 to facilitate the initial application of the hook over the edge of part P adjacent the opening 7 while the shoulder 31 defined by said hook is curved or rounded as shown in Fig. 2 in accordance with the contour of said opening 7 in order to fit the edge of said opening snugly and evenly, thereby closing said opening completely in the area of said hook or tongue 30.

At a suitable space from said tongue or hook 30, an imperforate depression or protuberance 35 is formed in the fastener base 11 to project out of the plane thereof from the same side thereof as said tongue 30. The imperforate depression 35 is so provided as to define a pronounced rounded shoulder 36 which is diametrically spaced from the rounded shoulder 31 on the hook 30, in accordance with the size of the assembling opening 7, a distance substantially equal to or slightly less than the diameter of said assembling opening. Accordingly, said rounded shoulders 31 and 36 defined by the hook and depression, respectively, are designed to engage opposing wall portions of said assembling opening 7 to lock the retainer firmly and rigidly in attached position and otherwise completely close and cover said opening against the entrance of water, dust and other foreign matter. Preferably the rounded shoulder 36 on the imperforate depression 35 is provided in slightly inclined relation in the manner of a cam shoulder adapted to cam against the engaged marginal edge of the assembling opening 7 to seat therein automatically in the most effective fastening position. In the event that the assembling opening 7 is of rectangular or other noncircular configuration, the spaced shoulders 31, 36, on the hook and depression, respectively, are suitably designed in accordance with the contour of such an assembling opening to engage therein snugly in a manner to cover and close said assembling opening.

Accordingly, with the retainer 10 thus provided and the supporting part P prepared with an assembling opening 7, Figs. 1, 2 and 4, the retainer may be easily and quickly attached to positive locked engagement with said supporting part simply by inserting the free end of the hook or tongue 30 into and through said assembling opening and sliding the fastener in the direction of said hook 30. The flared lip 32 formed on the extremity of said hook 30 facilitates this initial step in applying the hook over the edge of the assembling opening 7. By depressing the bowed or arched base or body 11 of the retainer and simultaneously sliding the retainer forward, the hook 30 clears the underside of the supporting part and permits the retainer to be advanced to its fully applied fastening position to the point at which the rounded shoulder 31 on said hook 30 snugly engages the adjacent wall of said assembling opening 7, substantially as shown in Figs. 2 and 4. In this position, the rounded locking shoulder 36 defined by the imperforate depression 35 is also received in the assembling opening 7 in engagement with an opposite wall thereof inasmuch as it is provided with a predetermined spacing from the shoulder 31 of the tongue or hook for this purpose and otherwise cooperates therewith in the assembling opening to lock the fastener in fully applied position on the supporting part P.

Thus, the opposing spaced shoulders 31, 36, cooperate in engaging opposite walls of the assembling opening 7 under spring tension to lock the fastener in attached position and otherwise prevent endwise displacement or rotative shifting movement of the retainer from final applied position. Likewise, in the event that the assembling opening is provided in the form of a rectangular slot, the imperforate depression 35 would be so provided as to define a flat end shoulder for engaging an end wall of such rectangular slot and flat side shoulders in abutting engagement with the adjacent straight sidewalls of the slot as a further means maintaining the retainer in fixed, nonrotative applied position on the supporting part. In any case, the spaced shoulders 31, 36, defined by the tongue and depression, respectively, are formed to correspond with the contour of the assembling opening employed to engage opposing walls thereof and thereby lock the retainer in attached position, as aforesaid, and further, with such shoulders designed for snug, close engagement with the engaged marginal portions of the assembling opening to cover and close the same against the passage of water, dust, and any other foreign matter. A retainer of this character is advantageously formed with a slightly bowed or arched base or body 11 in that the retainer body is thus provided with added resiliency permitting attachment thereof to supporting parts of different thicknesses inasmuch as such a bowed or arched fastener body may be depressed as necessary to permit the tongue or hook 30 to engage positively at the reverse side of any suitable supporting part in self-sustained fastening position thereon substantially as shown in Figs. 1, 2, and 4.

In the foregoing manner, a suitable number of retainers 10 are attached in similar assembling openings 7 provided in the supporting part P along the path which the molding M or other object extends in mounted position. The molding M may be provided of any suitable cross-section, but is usually in the form of a substantial channel shape including longitudinal inturned flanges 3, 4, as aforesaid, adapted to be sprung onto the attached retainers by substantial snap fastening engagement with the spring holding means thereof.

The retainers of the present invention are particularly suited for mounting wide, relatively heavy moldings which require a strong, durable and positively locked mounting. The molding M, Fig. 1, is of this character, and in mounting the same, the larger heavier beading portion 2 thereof is secured and supported by the larger, stronger spring holding arms 20—22 which include the lateral wings 24. The inturned flange 4 of the larger beading portion 2 is first applied to the untensioned spring arms 20—20 of the initially attached retainer, Fig. 5, with the edge of said flange 4 received in the space between the feet 26 on the lower ends of the wings 24 and the adjacent surface of part P, and with said edge of the flange 4 engaging the abutments 25. The other inturned flange 3 is then applied over the spring arm 13 in a snap fastening action which seats the molding M in fully secured relation with the retainer and in final applied mounted position on part P as shown in Fig. 1. The arrangement is such that as force is applied on the crown of the molding M, the edge of the inturned flange 3 cams on the inclined guide surface 15 to cause the spring arm 13 to flex slightly inwardly. At the same time, the flange 4 in engagement with the abutments 25 on wings 24, is drawn inwardly to cause the spring fingers 22 to be compressed inwardly toward the associated spring arms 20 from the untensioned position shown in Fig. 5 to the compressed tensioned relation illustrated in Fig. 1. This inward drawing of the molding flange 4 together with the slight inward flexing of the spring arm 13 permits the inturned flange 3 to snap over said spring arm 13 onto the inwardly inclined cam shoulder 14 whereupon the edge of said flange 3 moves automatically inwardly into its most effective seating on said cam shoulder 14 to a position substantially in engagement with the adjacent longitudinal edge of the fastener base 11 and substantially flush with the adjacent surface of the supporting part P.

In the inwardly compressed and tensioned position of the spring fingers 22, the bearing feet 26 defined by the lower ends of the wings 24 carried thereby clamp against relatively wide edge portions of the inturned flange 4 to provide a relatively strong and durable mounting of the molding in this regard. At the same time, the compressed tensioned relation of the spring fingers 22 toward their associated spring arms 20 is such as to exert an upward spring force on the fastener base 11 which in turn is transmitted to the attaching tongue 30 to add to the locking action thereof in attached fastening position in the assembling opening 7.

It is to be appreciated that from the standpoint of a fastener of general utility, the attaching means in the improved retainer of the invention is admirably suited for a wide range and variety of applications and uses in addition to molding installations for providing a locked attachment of the retainer in an assembling opening in a part and otherwise completely cover and close the assembling opening against the passage of water, dust and other foreign matter. Figs. 6 and 7, accordingly, illustrate a further embodiment of the invention in which the improved retainer is employed for mounting an object such as a cable C, tube, rod, or the like, onto an apertured support P' provided with a similar assembling opening 7'. The retainer 40 comprises a suitable body or base 41 having struck and formed therefrom a hook or tongue 30 and an imperforate depression 35 defining the locking shoulder 36 having the same general construction and purpose for attaching the retainer in the assembling opening 8 as described with reference to Figs. 1-5 inclusive. With the attaching means thus provided, either or both ends or sides of the retainer base 41 is formed into one or more spring arms 45 for retaining one or more objects such as a conduit C, Fig. 7, by a substantial snap fastening, clasping engagement therewith.

The improved retainer in any form preferably is constructed of relatively thin sheet metal, the thickness of which is selected according to service requirements and the predetermined size of the parts secured. The fasteners are most effective when provided of spring metal suitably spring tempered and otherwise treated to give the desired toughness and hardness, particularly in the case of devices which are put to heavy duty in installations where extreme vibratory motion takes place. A cheap but effective fastener may be provided from cold rolled metal, such as cold rolled steel, which is untempered but of a spring metal nature and capable of providing an effective and reliable fastening means.

While the invention has been described in detail with specific examples, such examples are intended as illustrations only, inasmuch as it will be apparent that other modifications in the construction, arrangement and general combination of parts may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning, and range of equivalency of the claims intended to be embraced therein.

What is claimed is:

1. A retainer adapted to be secured in a circular assembling opening in a part to secure an object to said part comprising, a sheet metal body defining means for retaining said object and a base having an imperforate portion covering and closing said assembling opening in said part, a preformed hook element extending from said retainer base adjacent said imperforate portion and projecting in spaced relation to the underside of the fastener base, a rounded shoulder defined by said hook corresponding substantially to the contour of said circular assembling opening, said hook being adapted to extend through said assembling opening and engage a side of said part in cooperation with the retainer base engaging the opposite side of said part and with said rounded shoulder on the hook snugly engaging a wall of said circular assembling opening in attached position, and an imperforate depression formed in said imperforate portion of the retainer base defining a rounded locking shoulder projecting from the underside of the fastener base in spaced opposing relation to said rounded shoulder on the hook and also corresponding substantially to the contour of said circular assembling opening, said rounded locking shoulder being adapted to engage the wall of said circular assembling opening opposite to that engaged by said rounded shoulder on the hook to prevent withdrawal of said hook from attached position in said assembling opening.

2. A retainer for mounting a molding having inturned flanges onto a supporting part, said retainer comprising a sheet metal body defining a base, means on said base for attaching the retainer to said supporting part, a pair of upwardly extending spring arms bent upwardly from said retainer base, one of said upwardly extending spring arms having an outward extension in the form of a downwardly extending return bent portion, and a wing on the side of said downwardly extending return bent portion defining an abutment for engaging a flange of said moulding.

3. A retainer for mounting a molding having inturned flanges onto a supporting part, said retainer comprising a sheet metal body defining a base, means on said base for attaching the retainer to said supporting part, a pair of upwardly extending spring arms bent upwardly from said retainer base, one of said upwardly extending spring arms having an outward extension in the form of a downwardly extending return bent portion, a wing on the side of said downwardly extending return bent portion defining an abutment and a portion adjacent said abutment for engaging the inner surface of a flange of said molding with said abutment engaging the edge of said flange.

4. A retainer for mounting a molding having inturned flanges onto a supporting part, said retainer comprising a sheet metal body defining a base, means on said base for attaching the retainer to said supporting part, spring holding means bent upwardly from said retainer base, one of said spring holding means comprising spaced upwardly extending spring arm portions having outward extensions in the form of downwardly extending return bent portions, and wings on the sides of said downwardly extending return bent portions defining abutments for engaging a flange of said molding.

5. A retainer for mounting a molding having inturned flanges onto a supporting part, said retainer comprising a sheet metal body defining a base, means on said base for attaching the retainer to said supporting part, spring holding means bent upwardly from said retainer base, one of said spring holding means comprising spaced upwardly extending spring arm portions having outward extensions in the form of downwardly extending return bent portions, wings on the sides of said downwardly extending return bent portions defining abutments and portions adjacent said abutments for engaging the inner surface of a flange of said molding with said abutments engaging the edge of said flange.

GEORGE A. TINNERMAN.

REFERENCES CITED

The following references are of record in the file of this patent:

UNITED STATES PATENTS

| Number | Name | Date |
| --- | --- | --- |
| 2,154,046 | Kost | Apr. 11, 1939 |
| 2,208,722 | Doty | July 23, 1940 |
| 2,208,727 | Marshall | July 23, 1940 |
| 2,217,574 | Tinnerman | Oct. 8, 1940 |
| 2,222,449 | Tinnerman | Nov. 19, 1940 |
| 2,227,290 | Wiley | Dec. 31, 1940 |
| 2,245,375 | Wiley | June 10, 1941 |
| 2,318,840 | Del Camp | May 11, 1943 |
| 2,476,207 | Brown | July 12, 1949 |